(12) United States Patent
Rhee et al.

(10) Patent No.: US 9,915,533 B2
(45) Date of Patent: Mar. 13, 2018

(54) TERMINAL APPARATUS, METHOD AND SYSTEM FOR SETTING UP DESTINATION AND PROVIDING INFORMATION

(71) Applicant: SAMSUNG ELECTRONICS CO., LTD., Suwon-si (KR)

(72) Inventors: Young-ho Rhee, Yongin-si (KR); Il-ku Chang, Seongnam-si (KR); Young-kyu Jin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/915,032

(22) Filed: Jun. 11, 2013

(65) Prior Publication Data

US 2013/0332074 A1    Dec. 12, 2013

Related U.S. Application Data

(60) Provisional application No. 61/658,095, filed on Jun. 11, 2012.

(30) Foreign Application Priority Data

Dec. 14, 2012  (KR) .................. 10-2012-0146560
May 31, 2013   (KR) .................. 10-2013-0062202

(51) Int. Cl.
  *G01C 21/00* (2006.01)
  *G06F 3/0482* (2013.01)
  (Continued)

(52) U.S. Cl.
  CPC ........... *G01C 21/00* (2013.01); *G06F 3/0482* (2013.01); *G06F 3/0484* (2013.01);
  (Continued)

(58) Field of Classification Search
  CPC .. G01C 21/00; G01C 21/3667; G01C 21/367; G01C 21/3673; G01C 21/3676;
  (Continued)

(56) References Cited

U.S. PATENT DOCUMENTS 6,810,323 B1 * 10/2004 Bullock .............. G08G 1/0969
                                                340/991
6,963,294 B2 * 11/2005 Kurosawa .......... G01C 21/3635
                                                340/995.19

(Continued)

FOREIGN PATENT DOCUMENTS

| CN | 1661330 A | 8/2005 |
| CN | 1661604 A | 8/2005 |

(Continued)

OTHER PUBLICATIONS

Communication dated Jun. 10, 2014, issued by the European Patent Office in counterpart European Application No. 13171404.0.

(Continued)

*Primary Examiner* — Jerrah Edwards
(74) *Attorney, Agent, or Firm* — Sughrue Mion, PLLC

(57) ABSTRACT

A terminal apparatus, a method and a system for setting up a destination and providing information are provided, in which the terminal apparatus includes a communicator which is configured to communicate with other terminal apparatuses, an input unit which is configured to receive a user command, a display which is configured to display a list including at least one item which corresponds to at least one of the other terminal apparatuses, and a controller which is configured to control the communicator to transmit destination information to a first terminal apparatus which corresponds to a selected item that is selected from among the at least one item included in the displayed list via the input unit. Accordingly, a user is provided with routes to the (Continued)

destination, without having to input address or name of the intended destination on his own terminal apparatus.

23 Claims, 9 Drawing Sheets

(51) Int. Cl.
*G06F 3/0484* (2013.01)
*H04M 3/42* (2006.01)
*H04W 4/02* (2018.01)

(52) U.S. Cl.
CPC ... *H04M 3/42348* (2013.01); *H04M 3/42382* (2013.01); *H04W 4/02* (2013.01); *H04M 2250/10* (2013.01)

(58) Field of Classification Search
CPC ............ G01C 21/3679; G01C 21/3682; G01C 21/3688; G01C 21/3691; G01C 21/3694; G01C 21/3697; G01C 21/28; G01C 21/32; G01C 21/34; G01C 21/3407; G01C 21/3415; G01C 21/343; G01C 21/3438; G01C 21/3476; G01C 21/3484; G01C 21/3605; G01C 21/3611; G01C 21/3614; G01C 21/3617; G01C 21/3641; G01C 21/3644; G01C 21/3661; G01C 21/3664; G06F 3/04815; G06F 3/04817; G06F 3/0482; G06F 3/0484; G06F 3/04842; G06F 3/04845; G06F 3/04847; G06F 3/0486; G06F 3/0487; G06F 3/0488; G06F 3/04883; H04M 1/72561; H04M 3/42042; H04M 3/42059; H04M 3/42068; H04M 3/42127; H04M 3/42348; H04M 3/42357; H04M 3/42365; H04M 3/42374; H04M 3/42382; H04M 9/001; H04M 2203/655; H04M 2207/187; H04M 2242/28; H04M 2242/30; H04M 2250/02; H04M 2250/06; H04M 2250/10; H04M 2250/22; H04M 2250/70; H04L 51/00; H04L 51/04; H04L 51/043; H04L 51/046; H04L 51/06; H04L 51/063; H04L 51/066; H04L 51/08; H04L 51/10; H04L 51/12; H04L 51/14; H04L 51/16; H04L 51/18; H04L 51/20; H04W 4/005; H04W 4/02; H04W 4/021; H04W 4/023; H04W 4/025; H04W 4/026; H04W 4/027; H04W 4/028; H04W 4/04; H04W 4/043; H04W 4/046; H04W 4/10; H04W 4/12; H04W 4/14; H04W 4/18; H04W 4/206
USPC .................................. 701/482, 487, 522, 537
See application file for complete search history.

(56) References Cited

U.S. PATENT DOCUMENTS

| | | | |
|---|---|---|---|
| 7,697,917 B2 | 4/2010 | Camp, Jr. et al. | |
| 7,805,740 B2 | 9/2010 | Gilboa et al. | |
| 7,853,403 B2 * | 12/2010 | Tanaka ............... | G01C 21/3453 340/988 |
| 7,933,609 B2 | 4/2011 | Lagerstedt et al. | |
| 8,090,367 B2 | 1/2012 | Kameyama | |
| 8,121,779 B2 | 2/2012 | Kon et al. | |
| 8,126,712 B2 | 2/2012 | Mukaigaito et al. | |
| 8,145,417 B1 * | 3/2012 | Chitre et al. .................. | 701/400 |
| 8,346,277 B2 | 1/2013 | Kim et al. | |
| 8,352,178 B2 * | 1/2013 | Allen ..................... | G01C 21/36 340/988 |
| 8,411,830 B2 | 4/2013 | Gilbert et al. | |
| 8,583,364 B2 | 11/2013 | Paik et al. | |
| 8,635,243 B2 | 1/2014 | Phillips et al. | |
| 8,825,362 B2 | 9/2014 | Kirsch | |
| 9,026,940 B2 | 5/2015 | Jung et al. | |
| 9,129,460 B2 | 9/2015 | McClellan et al. | |
| 2004/0225712 A1 | 11/2004 | Tajima et al. | |
| 2006/0223518 A1 | 10/2006 | Haney | |
| 2007/0249406 A1 | 10/2007 | Andreasson | |
| 2007/0271367 A1 * | 11/2007 | Yardeni ............... | G06Q 10/107 709/223 |
| 2008/0064446 A1 | 3/2008 | Camp et al. | |
| 2008/0200189 A1 | 8/2008 | Lagerstedt et al. | |
| 2008/0208462 A1 * | 8/2008 | Tanaka ............... | G01C 21/3453 701/414 |
| 2008/0250026 A1 | 10/2008 | Linden et al. | |
| 2008/0319602 A1 | 12/2008 | McClellan et al. | |
| 2009/0005072 A1 | 1/2009 | Forstall et al. | |
| 2009/0018832 A1 | 1/2009 | Mukaigaito et al. | |
| 2009/0054086 A1 | 2/2009 | Kim et al. | |
| 2009/0055273 A1 | 2/2009 | Miyazawa | |
| 2009/0157298 A1 | 6/2009 | Kon et al. | |
| 2009/0182587 A1 | 7/2009 | Lewis | |
| 2010/0009719 A1 | 1/2010 | Oh et al. | |
| 2010/0030463 A1 | 2/2010 | Tomizawa | |
| 2010/0138153 A1 | 6/2010 | Abe et al. | |
| 2010/0161215 A1 | 6/2010 | Karani | |
| 2010/0299142 A1 | 11/2010 | Freeman et al. | |
| 2011/0015858 A1 | 1/2011 | Takagi et al. | |
| 2011/0043652 A1 | 2/2011 | King et al. | |
| 2011/0054770 A1 * | 3/2011 | Allen ..................... | G01C 21/36 701/532 |
| 2011/0093520 A1 | 4/2011 | Doyle et al. | |
| 2011/0105097 A1 | 5/2011 | Tadayon et al. | |
| 2011/0242269 A1 | 10/2011 | Nothlings et al. | |
| 2012/0053966 A1 | 3/2012 | Kolodziej | |
| 2012/0096403 A1 | 4/2012 | Jung et al. | |
| 2012/0135714 A1 | 5/2012 | King, II | |
| 2012/0143496 A1 | 6/2012 | Chitre et al. | |
| 2012/0200571 A1 | 8/2012 | Newell | |
| 2013/0226453 A1 * | 8/2013 | Trussel et al. ................. | 701/533 |
| 2014/0018097 A1 | 1/2014 | Goldstein | |
| 2014/0129136 A1 * | 5/2014 | Celia ............................ | 701/445 |
| 2015/0017956 A1 | 1/2015 | Jeong | |
| 2015/0168154 A1 | 6/2015 | Boerger | |
| 2016/0110028 A1 | 4/2016 | Choi | |

FOREIGN PATENT DOCUMENTS

| | | |
|---|---|---|
| CN | 1811848 A | 8/2006 |
| CN | 101373139 A | 2/2009 |
| CN | 101458091 A | 6/2009 |
| CN | 101507250 A | 8/2009 |
| CN | 101596903 A | 12/2009 |
| CN | 101647300 A | 2/2010 |
| CN | 101675320 A | 3/2010 |
| CN | 101785038 A | 7/2010 |
| CN | 101833570 A | 9/2010 |
| CN | 102090079 A | 6/2011 |
| CN | 102419851 A | 4/2012 |
| CN | 102457617 A | 5/2012 |
| EP | 1 274 056 A2 | 1/2003 |
| EP | 2 028 506 A1 | 2/2009 |
| EP | 2028448 A2 | 2/2009 |
| EP | 2 164 237 A1 | 3/2010 |
| EP | 2442539 A1 | 4/2012 |
| JP | 2000-28377 A | 1/2000 |
| JP | 2002-207841 A | 7/2002 |
| JP | 2004-251692 A | 9/2004 |
| JP | 3758179 B2 | 3/2006 |
| JP | 2008-305239 A | 12/2008 |
| JP | 2009-37498 A | 2/2009 |
| JP | 2010-54484 A | 3/2010 |
| JP | 2010-236858 A | 10/2010 |
| JP | 2010-287048 A | 12/2010 |
| JP | 2011-4143 A | 1/2011 |
| KR | 10-2006-0094177 A | 8/2006 |
| KR | 10-2006-0120346 A | 11/2006 |
| KR | 10-2007-0075435 A | 7/2007 |
| KR | 10-2009-0108821 A | 10/2009 |

(56) References Cited

FOREIGN PATENT DOCUMENTS

| KR | 10-2011-0024170 A | 3/2011 |
| KR | 10-2011-0055204 A | 5/2011 |
| KR | 10-1042126 B1 | 6/2011 |
| KR | 1020120049058 A | 5/2012 |
| WO | 2008/027076 A1 | 3/2008 |
| WO | WO2006/085565 A1 | 6/2008 |
| WO | 2011/035390 A1 | 3/2011 |
| WO | 2011/053304 A1 | 5/2011 |

OTHER PUBLICATIONS

Communication, dated Oct. 15, 2013, issued by the European Patent Office in counterpart European Patent Application No. 13169437.4.
Communication, dated Oct. 30, 2013, issued by the European Patent Office in counterpart European Patent Application No. 13171460.2.
Communication, dated Oct. 30, 2013, issued by the European Patent Office in counterpart European Patent Application No. 13171404.0.
Communication dated Oct. 23, 2014, issued by the United States Patent and Trademark Office in counterpart U.S. Appl. No. 13/913,977.
Communication dated Oct. 28, 2015, issued by the United States Patent and Trademark Office in counterpart U.S. Appl. No. 13/914,892.
Communication dated Nov. 6, 2015, issued by the United States Patent and Trademark Office in counterpart U.S. Appl. No. 13/913,977.
Communication dated Jul. 17, 2015 issued by the U.S. Patent & Trademark Office in counterpart U.S. Appl. No. 13/913,977.
Communication dated Aug. 23, 2016, issued by the European Patent Office in counterpart European Patent Application No. 13804450.8.
Communication dated Mar. 28, 2016, issued by the United States Patent and Trademark Office in counterpart U.S. Appl. No. 13/914,892.
Communication dated Apr. 21, 2016, issued by the United States Patent and Trademark Office in counterpart U.S. Appl. No. 13/913,977.
Office Action dated Jan. 17, 2017, issued by the United States Patent and Trademark Office in counterpart U.S. Appl. No. 13/914,892.
Office Action dated Feb. 1, 2017, issued by the United States Patent and Trademark Office in counterpart U.S. Appl. No. 13/913,977.
Office Action dated Feb. 16, 2017, issued by the Korean Intellectual Property Office in counterpart Korean Application No. 10-2013-0062202.
Examination Report dated Feb. 27, 2017, issued by the European Patent Office in counterpart European Application No. 13804450.8.
Office Action dated Feb. 28, 2017, issued by the Intellectual Property Office of P.R. China in counterpart Chinese Application No. 201310233995.1.
Office Action dated Mar. 10, 2017, issued by the Intellectual Property Office of P.R. China in counterpart Chinese Application No. 201380030871.1.
Communication dated Jul. 14, 2017 issued by the Japanese Patent Office in counterpart Japanese Patent Application No. 2013-122764.
Communication dated Jul. 31, 2017 issued by the Japanese Patent Office in counterpart Japanese Patent Application No. 2013-122761.
Communication dated Aug. 16, 2017 issued by the United States Patent & Trademark Office in counterpart U.S. Appl. No. 13/913,977.
Communication dated Apr. 19, 2017, issued by the State Intellectual Property Office of the People's Republic of China in counterpart Chinese Patent Application No. 201310229339.4.
Communication dated May 10, 2017, issued by the Korean Intellectual Property Office in counterpart Korean Patent Application No. 10-2013-0062298.
Communication dated May 24, 2017, issued by the United States Patent & Trademark Office in counterpart U.S. Appl. No. 13/914,892.
Communication dated Jun. 2, 2017, issued by the State Intellectual Property Office of the People's Republic of China in counterpart Chinese Patent Application No. 201310231161.7.
Communication dated Oct. 11, 2017, issued by the State Intellectual Property Office of P.R. China in counterpart Chinese Application No. 201380030871.1.
Communication dated Nov. 3, 2017, issued by the United States Patent and Trademark Office in counterpart U.S. Appl. No. 13/913,977.

* cited by examiner

TERMINAL APPARATUS, METHOD AND SYSTEM FOR SETTING UP DESTINATION AND PROVIDING INFORMATION

CROSS-REFERENCE TO RELATED APPLICATIONS

This application claims priority from U.S. Provisional Patent Application No. 61/658,095, filed on Jun. 5, 2013 in the United States Patent and Trademark Office, Korean Patent Application No. 10-2012-014560, filed on Dec. 14, 2012 in the Korean Intellectual Property Office and Korean Patent Application No. 10-2013-0062202, filed on May 31, 2013, the disclosures of which are incorporated herein by reference in their entirety.

BACKGROUND

1. Field

Apparatuses, methods and systems consistent with exemplary embodiments relate to setting up destination and providing information, and more particularly, to a terminal apparatus which sets up destination by sharing position information, and a method and a system thereof.

2. Description of the Related Art

Automobile global positioning system (GPS) navigation unit generally guides routes based on destination information inputted by a driver. Specifically, a driver inputs the destination information about a point of interest into the navigation unit. Accordingly, the navigation unit provides at least one search result based on the destination information inputted by the driver, and suggests routes from the current position of the vehicle to the destination based on the search results selected by the driver.

Thus, because related art GPS navigation units provide routes according to destination information inputted by a driver, the driver should be aware of the destination address or the name that he is trying to move to. If a driver does not have the destination address or name, he may have difficulty in obtaining routes from the GPS navigation unit.

Particularly, a driver may have to input the destination address into the GPS navigation unit while driving a vehicle. In this case, because the driver cannot focus on the driving, he may be exposed to the risk of being involved in an accident.

Furthermore, if roads expand or new roads are opened, and if map data of the GPS navigation unit is not updated regularly, the GPS navigation unit may provide incorrect information to a user based on map data that has not been updated to a destination that a driver requests. For example, it is possible to shorten the distance of travel from points A to B by using a recently-constructed road. However, if the map data of the GPS navigation unit is not updated to a newest version, the GPS navigation unit provides routes based on old roads without providing information about the new road. Thus, a driver may be unable to arrive at the destination in an efficient or timely manner.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a terminal apparatus which may include a communicator which is configured to communicate with other terminal apparatuses, an input unit which is configured to receive a user command, a display which is configured to display a list including at least one item which corresponds to at least one of the other terminal apparatuses, and a controller which is configured to control the communicator to transmit destination information to a first terminal apparatus which corresponds to a selected item that is selected from among the at least one item included in the displayed list via the input unit.

If the navigation information is received from the first terminal apparatus by the communicator, the controller may control the display to display the received navigation information. The navigation information may include the destination information and current position information of the first terminal apparatus.

The navigation information may be received from the first terminal apparatuses based on a preset period, and the controller controls the display to update and display the navigation information according to the received navigation information.

If the current position information of the first terminal apparatuses is received from the first terminal apparatuses via the communicator, the controller may generate navigation information based on destination information of the terminal apparatus and the received current position information, and control the display to display the generated navigation information.

If a command to revise routes is inputted via the input unit, the controller may display the navigation information with the routes revised based on the inputted command to revise and control the communicator to transmit the revised route information to the first terminal apparatus.

The terminal apparatus may additionally include a storage which is configured to store at least one preset position information of the terminal apparatus. The controller may be further configured to control the display to display a destination list including an item corresponding to the at least one preset position information stored in the storage and an item corresponding to current position information of the terminal apparatus, when a user command for provision of position information is inputted.

The terminal apparatus may additionally include a global positioning system (GPS) receiver which is configured to receive GPS information of the terminal apparatus. If an item corresponding to the at least one preset position information stored at the storage is selected, the controller may be further configured to control the communicator to determine position information corresponding to the selected item corresponding to the at least one preset position information as destination information and transmit the destination information to the first terminal apparatuses, and if an item corresponding to the current position information is selected, the controller may be further configured to control the communicator to determine GPS information received from the GPS receiver as the destination information and transmit the destination information to the first terminal apparatus.

In one embodiment, a terminal apparatus is provided, which may include a communicator which is configured to communicate with a first terminal apparatus, an input unit which is configured to receive a user command, a display, and a controller which is configured to generate navigation information based on destination information and current position information of the terminal apparatus, if the destination information is received from a first terminal apparatus via the communicator.

If the destination information is received, the display may be further configured to display an inquiry message inquiring whether or not to generate the navigation information, and the controller may control the display to display the navigation information in response to the user command inputted via the input unit.

If revised route information is received from the first terminal apparatuses via the communicator, the controller may be further configured to control the display to update the navigation information according to the revised route information, and the display may display the navigation information which is updated according to the revised route information. The navigation information may be periodically updated based on a preset period, and the controller may control the communicator to transmit the navigation information to the first terminal apparatus, when a user command for location sharing is inputted via the input unit.

In one embodiment, a method for providing information for setting up a destination from a terminal apparatus to other terminal apparatuses is provided, which may include displaying a list including at least one item corresponding to at least one of the other terminal apparatuses, and transmitting destination information to a first terminal apparatuses which corresponds to a selected item that is selected from among the at least one item included in the displayed list.

The method may additionally include displaying received navigation information, when the navigation information is received from the first terminal apparatus, and the navigation information may include the destination information and the current position information of the first terminal apparatus. The navigation information may be received from the first terminal apparatuses based on a preset period, and the displaying may include updating and displaying the navigation information according to the received navigation information.

The method may additionally include, when the current position information of the first terminal apparatus is received from the first terminal apparatus, generating navigation information based on the destination information and the received current position information and displaying the generated navigation information. The method may additionally include, when a command to revise the routes is inputted, displaying navigation information with the routes revised based on the inputted command to revise, and transmitting the revised route information to the first terminal apparatus.

The transmitting the destination information may include, when a user command for provision of position information is inputted, displaying a destination list including an item corresponding to at least one or more of prestored position information and an item corresponding to the current position information of the terminal apparatus. The transmitting the destination information may additionally include inputting a user command while displaying the destination list, and determining position information corresponding to a selected item as destination information, if the inputted user command directs to select an item corresponding to at least one or more of the prestored position, or receiving global positioning system (GPS) information and determining the received GPS information as the destination information, if the inputted user command is a command to select the item corresponding to the current position information.

In one embodiment, a method for setting up a destination at a terminal apparatus is provided, which may include receiving destination information from a first terminal apparatuses, acquiring current position information of the terminal apparatus, and generating navigation information based on the received destination information and the acquired current position information.

The method may additionally include displaying an inquiry message asking whether to generate the navigation information, and displaying the generated navigation information, according to the inputted user command. The method may additionally include updating and displaying the navigation information according to revised route information, if the revised route information is received from the first terminal apparatuses.

The navigation information may be periodically updated based on a preset period, and the method may additionally include transmitting the navigation information to the first terminal, when a user command for location sharing is inputted.

In one embodiment, a system for sharing position information is provided, which may include a first terminal apparatus which transmits destination information to set up a destination to a terminal apparatus corresponding to an item selected from among a plurality of prestored items, and a second terminal apparatus which generates navigation information based on the destination information received from the first terminal apparatus and current position information.

In one embodiment, a method of setting up a destination between a first terminal apparatus and a second terminal apparatus is provided, which may include displaying, on the first terminal apparatus, an item comprising profile information on users of the first and second terminal apparatuses, displaying the profile information of the user of the first terminal apparatus on the first terminal apparatus, when the item of the user of the first terminal apparatus is selected, displaying, on the first terminal apparatus, a destination list comprising restored position information of the first terminal apparatus and current position information of the first terminal apparatus, in response to a user command, selecting at least one of the preset position information and the current position information on the destination list as destination information, selecting the item of the second terminal apparatus, and transmitting the destination information to the second terminal apparatus.

Upon receiving the destination information, the second terminal apparatus may generate navigation information based on the received destination information and current position information of the second terminal apparatus.

The second terminal apparatus may display the generated navigation information, and transmit the generated navigation information to the first terminal apparatus.

The profile information may include at least one of a name or an address of a user of the first terminal apparatus and the second terminal apparatus.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
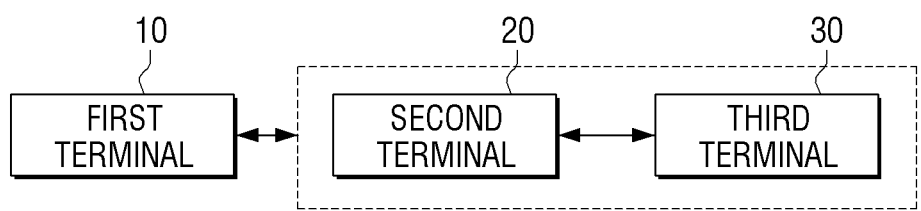
FIG. 1 illustrates a system for sharing position information to set up destination according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Accordingly, it is apparent that the exemplary embodiments may be carried out without those specifically defined matters. Also, well-known functions or constructions are not described in detail since they would obscure the exemplary embodiments with unnecessary detail.

FIG. 1 illustrates a system for sharing position information to set up destination according to an exemplary embodiment.

Referring to FIG. 1, a position information sharing system includes a first terminal apparatus 10, a second terminal apparatus 20, and a third terminal apparatus 30. The first terminal apparatus 10 may be a device, such as a smart phone, which performs wireless communication, and may provide position information for setting up a destination to the second terminal apparatus 20. The second terminal apparatus 20 may be a device such as a smart phone, which can perform wireless communication, and may set up a destination and routes to the destination based on the position information for setting up information provided from the first terminal apparatus 10 through wireless communication. In other words, if the second terminal apparatus 20 receives position information for setting up information from the first terminal apparatus 10, the second terminal apparatus 20 establishes routes to move toward the destination based on current position information of the second terminal apparatus 20 and the received position information of the first terminal apparatus 10.

The second terminal apparatus 20 may then generate and display navigation information including routes indicated on previously stored map data.

However, the exemplary embodiment is not specifically limited. Accordingly, as illustrated, the second terminal apparatus 20 may communicate with the third terminal apparatus 30 to either transmit previously-generated navigation information to the third terminal apparatus 30 or transmit the position information received from the first terminal apparatus 10 to the third terminal apparatus 30. The third terminal apparatus 30 may be a navigation terminal capable of GPS reception.

For example, the second terminal apparatus 20 may be such a terminal apparatus that cannot generate navigation information based on the position information received from the first terminal apparatus 10. In this case, the second terminal apparatus 20 may transmit the position information received from the first terminal apparatus 10 to the third terminal apparatus 30. Accordingly, the third terminal apparatus 30 may generate navigation information based on the position information received from the second terminal apparatus 20 and the current position information of the third terminal apparatus 30 and display the generated navigation information.

In another example, the second terminal apparatus 20 may be such a terminal apparatus that cannot display the navigation information generated based on the position information received from the first terminal apparatus 10 and the current position information of the second terminal apparatus 20. In this case, the second terminal apparatus 20 may transmit previously-generated navigation information to the third terminal apparatus 30 and the third terminal apparatus 30 may display the navigation information received from the second terminal apparatus 20 on a screen.

Thus, user "A" can move toward the destination according to navigation information displayed on the second terminal apparatus 20, or displayed on the third terminal apparatus 30 which may be an automobile GPS navigation unit installed in the vehicle.

In the exemplary embodiment, the first terminal apparatus 10 may provide position information for setting up a destination and the second terminal apparatus 20 may be limited to a terminal apparatus which may set up a destination and display navigation information based on the position information provided from the first terminal apparatus 10 for the purpose of destination setup. Further, the third terminal apparatus 30 may be limited to a terminal apparatus which may set up a destination or display navigation information based on the position information of the first terminal apparatus 10 as provided from the second terminal apparatus 20, when it is not easy to set up a destination or display navigation information at the second terminal apparatus 20. However, the exemplary embodiments are not limited thereto. Accordingly, the second terminal apparatus 20 may provide position information for setting up the destination and the first terminal apparatus 10 may establish the destination and display navigation information based on the position information provided from the second terminal apparatus 20. In this case, the third terminal apparatus 30 may communicate with the first terminal apparatus 10, and particularly in cases where it is not easy to set up a destination or display navigation information at the first terminal apparatus 10, the third terminal apparatus 30 may be implemented as a terminal apparatus which sets up a destination or display navigation information based on the position information of the second terminal apparatus 20 as provided from the first terminal apparatus 10. According to the exemplary embodiment, it is assumed that the first terminal apparatus 10 provides position information for setting up the destination and the second terminal apparatus 20 establishes the destination, and the third terminal apparatus 30 performs communication with the second terminal apparatus 20 FIG. 2 is an exemplary view illustrating the operation of a position information sharing system according to an exemplary embodiment.

Figure 2:
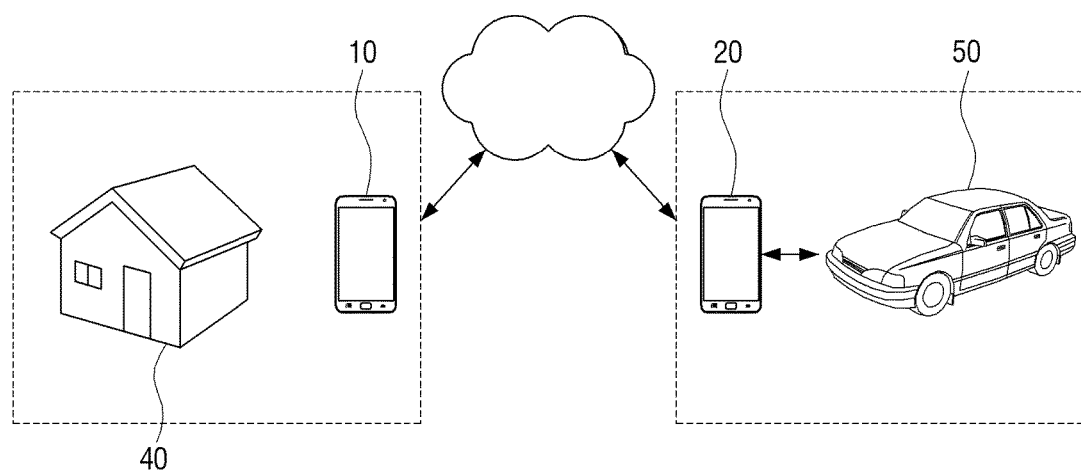
FIG. 2 is an exemplary view illustrating the operation of a position information sharing system according to an exemplary embodiment.

Referring to FIG. 2, for example, if user "B" who does not know the home address of user "A" has to move toward user "A's" home 40, the second terminal apparatus 20 of user "B" may request position information of user "A's" home 40 from the first terminal apparatus 10 of user "A". According to a request for position information, the first terminal apparatus 10 may transmit prestored destination information of home 40 to the second terminal apparatus 20. For another example, user "A" may ask user "B" to meet at a current position of user "A". In this case, the first terminal apparatus 10 may transmit current position information as destination information to the second terminal apparatus 20 upon user "A's" request.

In yet another embodiment, user "A" may request user "B" that the two meet at one of the places that user "A" has recently been to. In this case, upon request by user "A", the first terminal apparatus 10 may set up destination information based on the position information selected by user "A" among the position information on the recently-visited places and transmit the set destination information to the second terminal apparatus 20, Thus, if destination information is received from the first terminal apparatus 10, the second terminal apparatus 20 generates and displays navigation information to guide routes from the current position of user "B" to a destination based on the destination information received from the first terminal apparatus 10, and current position information of the second terminal apparatus 20. The second terminal apparatus 20 may transmit previously-generated navigation information as navigation information to the third terminal apparatus 30 mounted in a vehicle 50 according to user "B's" request. Accordingly, the third terminal apparatus 30 may display the navigation information received from the second terminal apparatus 20 on a screen. Meanwhile, if it is not easy for the second terminal apparatus 20 to generate navigation information based on the destination information received from the first terminal apparatus 10, the second terminal apparatus 20 may transmit the destination information received from the first terminal apparatus 10 to the third terminal apparatus 30. In this case, the third terminal apparatus 30 may generate navigation information based on the destination information of the first terminal apparatus 10 as received from the second terminal apparatus 20 and the current position information of the third terminal apparatus 30 and display the generated navigation information on the screen. User "B" may drive the vehicle 50 according to the navigation information displayed through the second terminal apparatus 20 or the third terminal apparatus 30 mounted in the vehicle 50, and move to the destination corresponding to the destination information transmitted from the first terminal apparatus 10.

The second terminal apparatus 20 may update previously-generated navigation information according to routes of user "B" and display the updated information on a screen, or transmit the updated information to the third terminal apparatus 30. If the updated information is transmitted to the third terminal apparatus 30, the third terminal apparatus 30 may receive the updated navigation information from the second terminal apparatus 20 and display the received information on a screen. However, when the third terminal apparatus 30 generates navigation information and displays the same on the screen, the third terminal apparatus 30 may update the previously-generated navigation information according to the route of travel of user "B" and display the same on the screen, and transmit the updated navigation information to the second terminal apparatus 20. Accordingly, the second terminal apparatus 20 may transmit to the first terminal apparatus 10 the navigation information which is periodically updated according to the route of travel of user "B" or navigation information updated and received from the third terminal apparatus 30. Accordingly, the first terminal apparatus 10 may display the navigation information transmitted from the second terminal apparatus 20 on the screen. As a result, user "A" may monitor in real-time the current location of user "B".

Hereinbelow, each of the components of a terminal apparatus sharing position information for setting up a destination and establishing the destination based on the shared position information will be described in detail below.

Figure 3:
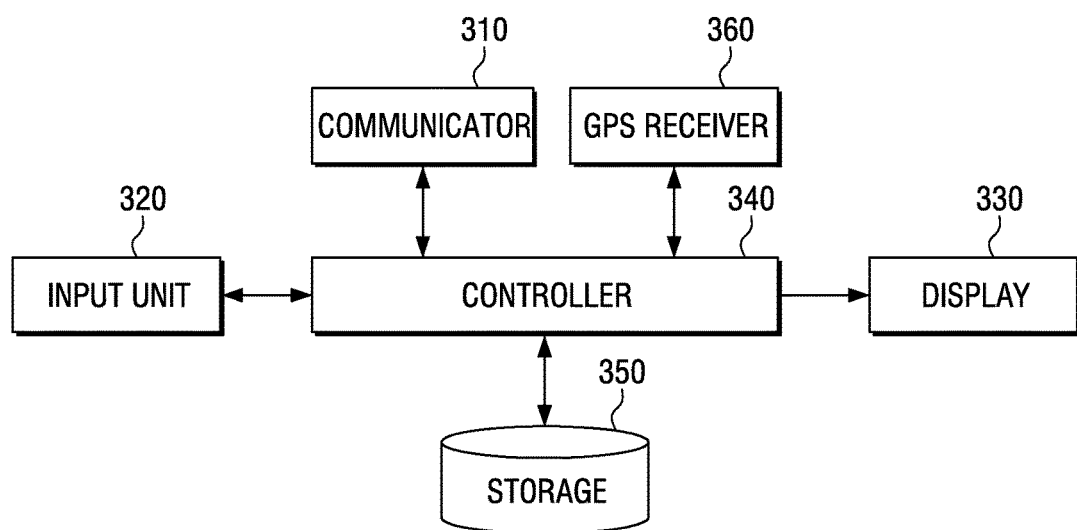
FIG. 3 is a block diagram of a terminal apparatus according to an exemplary embodiment.

FIG. 3 is a block diagram of a terminal apparatus according to an exemplary embodiment.

Prior to explaining FIG. 3, a terminal apparatus may perform operations of the first terminal apparatus 10 and the second terminal apparatus 20, as described above. That is, the terminal apparatus may, like the first terminal apparatus 10 explained above, provide destination information to another terminal apparatus (i.e., second terminal apparatus 20), or set up a destination based on the destination information provided from the second terminal apparatus 20. Therefore, the following exemplary embodiment relates to the first terminal apparatus 10 providing destination information, and establishing destination based on received destination information.

Below will describe operation of the first terminal apparatus 10 providing destination information to the second terminal apparatus 20. The first terminal apparatus 10 includes a communicator 310, an input unit 320, a display 330, a controller 340, and a display 350. The communicator 310 communicates with a plurality of second terminal apparatuses. Specifically, the communicator 310 communicates with at least one from among a plurality of second terminal apparatuses such as a smart phone which may be in the vicinity of the first terminal, and which may perform wireless communication. The communicator 310 may be a communication module such as a near field wireless communication (NFC) module (not illustrated) or a wireless communication module (not illustrated). The near field wireless communication module (not illustrated) involves wireless communication with the second terminal apparatus 20 placed at a near distance; for example, it may be Bluetooth, Zigbee, or Near Field Communication (NFC). The wireless communication module (not illustrated) accesses a mobile communication network and performs communication with the second terminal apparatus 20 according to various mobile communication standards such as WiFi, 3rd Generation (3G), 3rd Generation Partnership Project (3GPP), and Long Term Evolution (LTE).

The input unit 320 receives user commands. In other words, the input unit 320 may receive user commands to select operations made by various user manipulations, and transmit the received commands to the controller 340. An input panel may be implemented as the input unit 320. The input panel may be implemented as a touch pad, a key pad having various function keys, number keys and character keys, or a touch screen. However, the input panel is not limited thereto.

The display 330, may display various contents, and may display a list including at least one or more items corresponding to at least one or more of second terminal apparatuses. The display 330 may preferably display the list inclusive of items corresponding to the first terminal apparatus 10. The items for inclusion into the list provide profile information including name and contact information of the user who owns the first terminal apparatus 10, and profile information including names or address information of acquainted people who have the second terminal apparatuses 20.

The display 330 may display the list of at least one of the above items. The display 330 may be implemented as a touch screen which perceives touch, a Cathode Ray Tube (CRT), a Liquid Crystal Display (LCD), a Thin Film Transistor Liquid Crystal Display (TFT-LCD), a Plasma Display Panel (PDP), a flexible display, or a Head Mounted Display (HMD), but is not limited thereto.

The controller 340 controls the overall operations of the respective components of the first terminal apparatus 10. If one item is selected from among at least one or more displayed items via the input unit 320, the controller 340 transmits destination information to the second terminal apparatus 20 corresponding to the selected item. For the above process, the first terminal apparatus 10 may further include a storage 350 and a Global Positioning System (GPS) receiver 360. The storage 350 may be a non-volatile memory such as a flash memory, and may store at least one preset position information and profile information of at least one acquainted person. For example, the preset position information may concern the location of home, the office, or at least one of the places visited by user "A" for a preset period of time of a user who has the first terminal apparatus 10 (Hereinafter, 'user "A"').

The GPS receiver 360 may periodically receive GPS information delivering current position information of the first terminal apparatus 10.

Thus, if a user command to provide position information is inputted through the input unit 320, the display 330 displays a list of items showing profile information regarding at least one acquainted persons stored in the storage 350 according to a control command of the controller 340. While displaying the list of items, if an item showing profile information of at least one acquainted person (hereinafter, 'user "B"') is selected through the input unit 320, the controller 340 controls the display 330 to display a destination list including items corresponding to position information stored in the storage 350 and items corresponding to the current position information of the first terminal apparatus 10. As explained above, the position information stored at the storage 350 may concern at least one of the home of user "A", office of user "A", or at least one of the places visited by user "A" for a preset period of time. While displaying the destination list having the above plurality of items, if an item corresponding to at least one position information is selected, the controller 340 determines position information corresponding to the selected item as destination information. If an item corresponding to the current position information of the first terminal apparatus 10 is selected, the controller 340 determines GPS information received from the GPS receiver 360 as destination information. As a result, if destination information is determined by a user command to select a destination, the controller 340 may transmit the determined destination information to the second terminal apparatus 20. The controller 340 may control the display 330 to display generated navigation information based on the destination information transmitted to the second terminal apparatus 20 and current position information of the second terminal apparatus 20.

According to an exemplary embodiment, the controller 340 controls the display 330 to display received navigation information, if navigation information is received by the communicator 310 from the second terminal apparatus 20 transmitting destination information. The navigation information may include map data stored in the second terminal apparatus 20 with routes to final destination marked thereon, based on destination information received from the first terminal apparatus 10 and current position information of the second terminal apparatus 20. Navigation information may be updated regularly on preset period by the second terminal apparatus 20. Thus, if navigation information updated at a preset period is received through the communicator 310, the controller 340 may update and display navigation information according to the received navigation information. According to another exemplary embodiment, if current position information of the other terminal apparatuses is received through the communicator 310 from the second terminal apparatus 20, the controller 340 may generate navigation information based on destination information transmitted to the second terminal apparatus 20 and current position information received from the second terminal apparatus 20. Specifically, the storage 350 described above may further store map data. Thus, if current position information of the second terminal apparatus 20 is received from the second terminal apparatus 20, the controller 340 may mark routes on map data stored in the storage 350 based on destination information transmitted to the second terminal apparatus 20 and current position information received from the second terminal apparatus 20. Accordingly, the controller 340 generates navigation information including the route-marked map data and controls the display 330 to display the generated navigation information.

The second terminal apparatus 20 may transmit updated current position information to the first terminal apparatus (10) at a preset period to the terminal apparatus. In this case, the controller 340 updates currently generated navigation information based on destination information transmitted to the second terminal apparatus 20 and the current position information of the second terminal apparatus 20. Thus, the display 330 may display updated navigation information.

Accordingly, the first terminal apparatus 10 of user "A" and the second terminal apparatus 20 of user "B" may display navigation information marking routes from a current position of user "B" to a destination of user "A". The user "B" can move to a destination that user "A" establishes according to displayed navigation information on a screen of his terminal apparatus, i.e., the second terminal apparatus 20. Further, user "A" can monitor at real time which point user "B" currently moves through displayed navigation information on the first terminal apparatus 10.

User "A" may monitor which point user "B" currently moves with the first terminal apparatus 10, and may find that user "B" currently moves on an incorrect route or that routes marked on the displayed navigation information are not advisable. In this case, user "A" may use inputting means such as a touch pen, to input suggested routes that he believes are more efficient, and request to revise routes. According to a request to revise routes, the controller 340 may display suggested routes inputted from user "A" on routes currently marked on the displayed navigation information. With the above, the controller 340 transmits route information revised by user "A" to the second terminal apparatus 20 through the communicator 310. If the revised route information is received from the first terminal apparatus 10, the second terminal apparatus 20 updates the displayed navigation information on a screen based on the revised route information. In other words, the second terminal apparatus 20 revises routes marked on the navigation information to the routes suggested by user "A". Thus, user "B" may move by referring to the routes suggested by user "A".

The following will describe the operation of the first terminal apparatus 10 of setting up a destination based on destination information provided from the second terminal apparatus 20.

As described above, the communicator 310 may receive destination information from the second terminal apparatus 20 by communicating with the second terminal apparatus 20. If destination information is received from the second terminal apparatus 20, the controller 340 generates navigation information based on the destination information received from the second terminal apparatus 20 via the communicator 310 and the current position information of the first terminal apparatus 10.

To be specific, when the destination information is received from the second terminal apparatus 20 via the communicator 310, the controller 340 may generate inquiry message on whether or not to generate navigation information based on the destination information, and control the display 330 to display the generated inquiry message. Accordingly, the display 330 displays the inquiry message asking whether or not to generate navigation information. The inquiry message may include a message which informs that destination information is received from the second terminal apparatus 20.

While displaying the inquiry message, if a user command to generate navigation information is inputted through the input unit 320, the controller 340 generates navigation information based on the destination information received from the second terminal apparatus 20 and current position information of the first terminal apparatus 10. In other words, the controller 340 generates navigation information including routes marked on map data stored in the storage 350 based on the destination information received from the second terminal apparatus 20 and GPS information received from the GPS receiver 360. When the navigation information is generated, the storage 350 stores the previously-generated navigation information according to a control command of the controller 340. Accordingly, when a user command is inputted through the input unit 320 in a state that navigation information is stored in advance, the controller 340 controls the display 330 to display the previously-stored navigation information based on the inputted user command. As a result, the display 330 may display the previously-generated navigation information. However, exemplary embodiments are not specifically limited. Accordingly, the controller 340 may display, in real-time, navigation information as generated. When a user command to share location is inputted through the input unit 320 in a state that there is generated navigation information, the controller 340 controls the communicator 310 to transmit the previously-generated navigation information to the second terminal apparatus 20 which transmits the destination information. Meanwhile, the navigation information as explained above may be updated periodically, based on a preset period. Accordingly, on receipt of a user command for location sharing, the controller 340 may control the communicator 310 to transmit the updated navigation information to the second terminal apparatus 20 as the navigation information is updated periodically.

Accordingly, the second terminal apparatus 20 may periodically update the navigation information received from the first terminal apparatus 10 and display the same on the screen. In one exemplary embodiment, if a user command to share location is inputted, the controller 340 may control the communicator 310 to transmit current position information of the first terminal apparatus 10, i.e., to transmit GPS information to the second terminal apparatus 20 which transmitted the destination information. In this case, the controller 340 may control the communicator 310 to transmit the GPS information, which is the current position information of the first terminal apparatus 10, to the second terminal apparatus 20 according to a preset period.

Accordingly, the second terminal apparatus 20 may generate navigation information, and periodically update and display the same, based on the GPS information received from the first terminal apparatus 10 and the destination information transmitted to the first terminal apparatus 10

The first terminal apparatus 10 and the second terminal apparatus 20 according to an exemplary embodiment may display navigation information in which routes from a current position of user "A" to destination are uniformly established. Thus, user "A" may move to the destination that user "B" establishes according to the displayed navigation information on a screen of the first terminal apparatus 10. User "B" may monitor at real time which point user "A" currently moves through the displayed navigation information. If revised route information is received from the second terminal apparatus 20 by the communicator 310, the controller 340 may update navigation information which is currently displayed on a screen according to the revised route information and display the updated information. An operation for updating and displaying navigation information according to revised routes is explained in detail above, and thus will not be further described below for the sake of brevity.

The discussion above describes in detail an operation of providing position information for setting up a destination from the first terminal apparatus 10 to the second terminal apparatus 20, and an operation establishing a destination based on the position information received from the second terminal apparatus 20 according to an exemplary embodiment. The following will further explain an operation of the first terminal apparatus 10 according to another exemplary embodiment.

Figure 4:
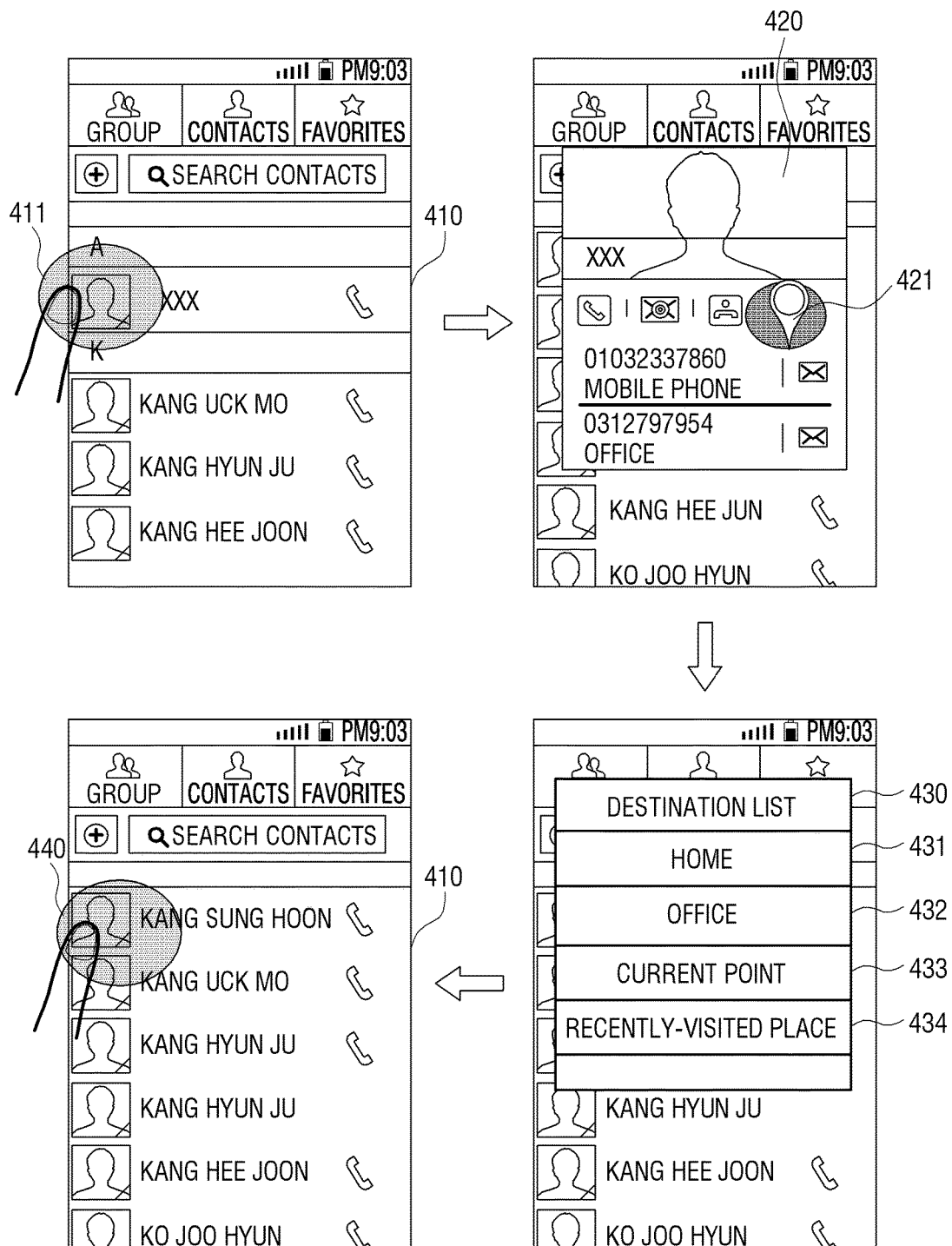
FIG. 4 is an exemplary view illustrating a first terminal apparatus 10 providing destination information according to an exemplary embodiment.

FIG. 4 is a view illustrating the first terminal apparatus 10 providing destination information according to an exemplary embodiment.

Referring to FIG. 4, the first terminal apparatus 10 generates a list 410 of items, including profile information about the pre-stored user "A" and all the other users including user "B", and display the same. After that, when an item 411 corresponding to user "A" is selected according to user command, the first terminal apparatus 10 displays the profile information 420 of user "A" on the screen. After that, when a user command for location information sharing is inputted, the first terminal apparatus 10 generates a destination list 430 to provide location information and display the generated list 430 on the screen. That is, the first terminal apparatus 10 generates a destination list 430 and displays the same on the screen, when the icon 421 associated with location information sharing is selected from the profile information 420 of user "A".

As illustrated, the destination list 430 may include items for home 431 of user "A", office 432 of user "A", current location 433 and recently-visited place 434. With the destination list 430 including a plurality of items on display, when one item is selected, the first terminal apparatus 10 determines the selected item to be the destination information. After that, when the item 440 of the user to receive destination information is selected from among the items corresponding to a plurality of users included in the list 410, the first terminal apparatus 10 transmits the pre-determined destination information of the user corresponding to the selected item 441 to the second terminal apparatus 20.

For example, user "A" may select an item for home 431 from among a plurality of items on the destination list 430 as displayed on the screen, to thus enable user "B" to come to the home of user "A". After that, when user "B" to receive the location information related to the item for home 431 is selected, the first terminal apparatus 10 may determine the location information about home 431 to be the destination information and transmit the same to the second terminal apparatus 20 of user "B".

In another embodiment, user "A" may select an item about current location 433 from among the plurality of items on the destination list 430 displayed on the screen, to enable user "B" to come to the currently position of user "A". When the item for the current location 433 is selected, the first terminal apparatus 10 acquires the current position information of user "A" based on the GPS information received via the GPS receiver 360. After that, when user "B" to receive position information related to the item for current location 433 is selected, the first terminal apparatus 10 may determine the previously-acquired position information to be the destination information and transmit the same to the second terminal apparatus 20 of user "B".

In yet another embodiment, user "A" may select an item for the recently-visited place 434 from among a plurality of items on the destination list 430 displayed on the screen, to enable user "B" to come to one of the places recently-visited by user "A" or to share the corresponding place with user "B". When the item is selected, the first terminal apparatus 10 may generate a list of position information on the previously-stored recently-visited places of the storage 350 and display the same. Depending on embodiments, the first terminal apparatus 10 may store position information on the places that were visited for the recent one month. Accordingly, when an item for the recently-visited place 434 is selected, the first terminal apparatus 10 may acquire position information on the places recently visited by user "A" for the past one month and display a list of visited places (not illustrated) based on the acquired position information. Accordingly, user "A" may select a place to meet with user "B" or share with user "B" from the list of visited places as displayed on the screen. After that, when user "B" to receive position information on the selected place is selected, the first terminal apparatus 10 may determine the position information about the place selected by user "A" to be destination information and transmit the same to the second terminal apparatus 20 of user "B".

Accordingly, the second terminal apparatus 20 may generate navigation information based on the destination information as received from the first terminal apparatus 10.

Figure 5:
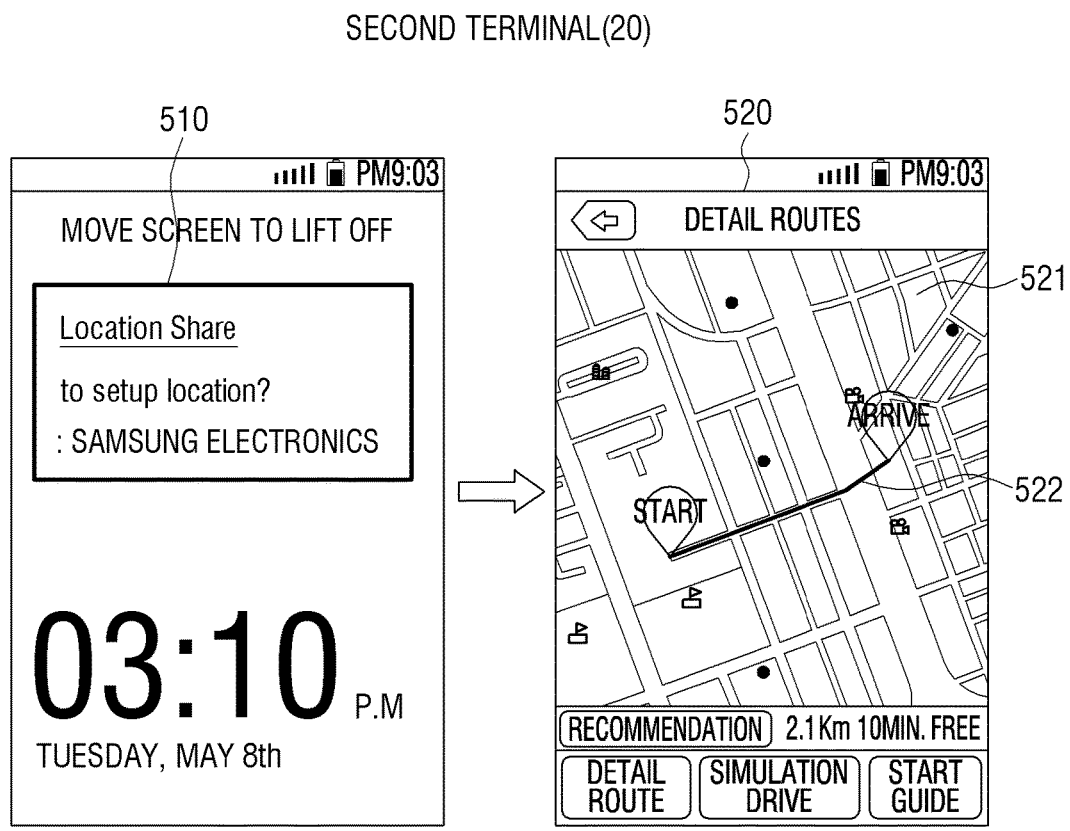
FIG. 5 is an exemplary view illustrating a second terminal apparatus generating navigation information according to an exemplary embodiment.

FIG. 5 is an exemplary view illustrating the second terminal apparatus generating navigation information according to an exemplary embodiment.

Referring to FIG. 5, if destination information is received from the first terminal apparatus 10, the second terminal apparatus 20 generates and displays an inquiry message asking whether or not to generate navigation information.

For example, if destination information of user "A's" office (e.g., "Samsung Electronics") is received from the first terminal apparatus 10, the second terminal apparatus 20 may generate and display an inquiry message 510 asking whether or not to generate navigation information regarding destination information of "Samsung Electronics." While the inquiry message 510 is displayed, if a user command to generate navigation information is inputted from user B, the second terminal apparatus 20 generates navigation information 520 based on current position information of the second terminal apparatus 20 and the destination information received from the first terminal apparatus 10. In this case, the navigation information 520 may include map data 521 prestored in the second terminal apparatus 20 on which routes 522 from a current position of the second terminal apparatus 20 to "Samsung Electronics" are marked. When a user command is inputted in a state that there is such generated navigation information 520, the second terminal apparatus 20 displays the previously-generated navigation information 520 on a screen Further, when a user command for location sharing is inputted, the second terminal apparatus 20 transmits the previously-generated navigation information to the first terminal apparatus 10.

Thus, the first terminal apparatus 10 and the second terminal apparatus 20 share the navigation information 520 on which the same routes are marked, and user "B" can move to the destination, "Samsung Electronics," based on the navigation information 520 displayed on the second terminal apparatus 20. The user "A" may monitor the point user "B" is currently passing, based on the navigation information 520 displayed on the first terminal apparatus 10.

User "A" monitoring routes of user "B" through the first terminal apparatus 10 may find that user "B" does not move to the destination based on the navigation information 520, or that the route 522 marked on the navigation information 520 is less advisable or efficient. In that case, the user "A" may provide routes revised at the first terminal apparatus 10 to the second terminal apparatus 20. Hereinbelow, the operation of providing routes revised at the first terminal apparatus 10 to the second terminal apparatus 20 will be explained.

Figure 6:
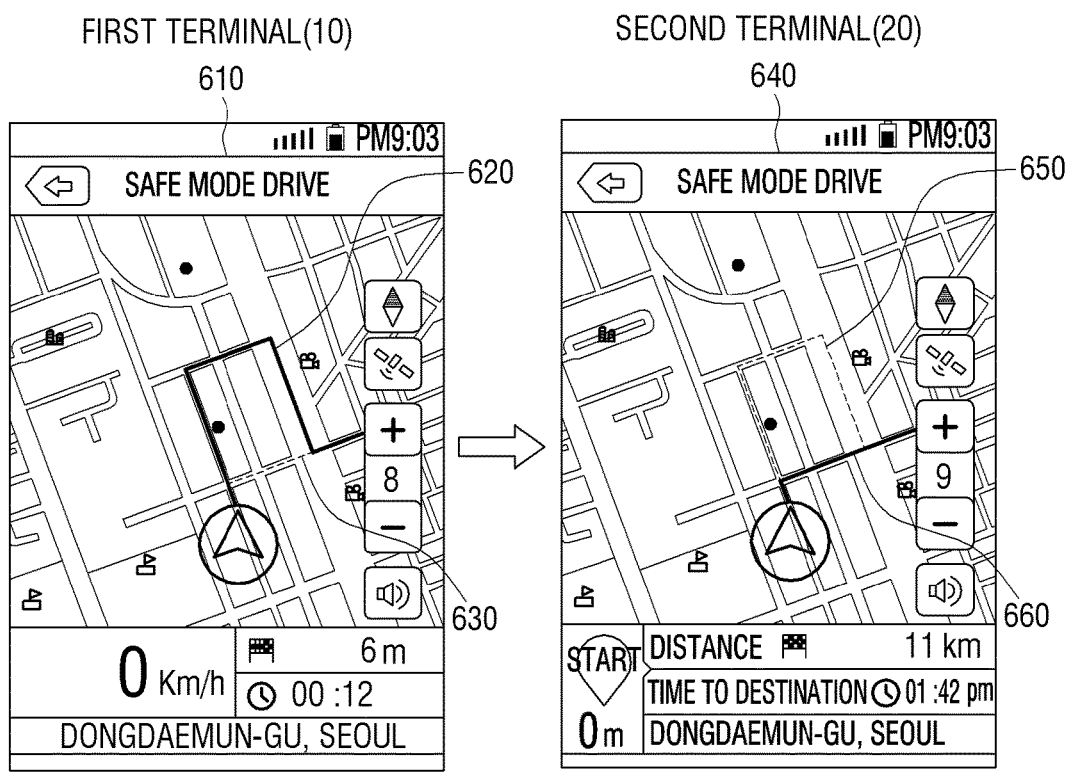
FIG. 6 is an exemplary view illustrating a first terminal apparatus providing revised routes to a second terminal apparatus according to an exemplary embodiment.

FIG. 6 is an exemplary view illustrating the first terminal apparatus providing revised routes to the second terminal apparatus according to an exemplary embodiment.

Referring to FIG. 6, the first terminal apparatus 10 may display navigation information 610 transmitted from the second terminal apparatus 20. Thus, user "A" may monitor the navigation information 610 displayed on the first terminal apparatus 10 and check the point user "B" is currently passing or whether routes from the current position of user "B" to the destination established by user "A" is correct.

For example, as illustrated in FIG. 6, user "A" may check the route 620 to the destination for user "B" to follow, through the navigation information displayed on a screen of the first terminal apparatus 10. As a result, if determining that the currently established route 620 is not advisable, user "A" may input a suggested alternative route 630 on the map data displayed on a screen of user "A's" terminal using a touch pen. If the suggested alternative route 630 is inputted, the first terminal apparatus 10 marks the suggested alternative route 630 on the map data based on the inputted suggested alternative route 630. According to an inputted user command, the first terminal apparatus 10 transmits the revised route information to the second terminal apparatus 20 so that user "B" revises the route based on the suggested alternative route 630 inputted by user "A".

Thus, the second terminal apparatus 20 updates and displays navigation information 640 currently displayed on a screen of the second terminal 20 based on the revised route information received from the first terminal apparatus 10. In other words, the second terminal apparatus 20 revises and displays route 650 marked on the map data of the navigation information 640 based on route 660 corresponding to the suggested alternative route 630 of user "A" according to the revised route information received from the first terminal apparatus 10. At the same time, the second terminal apparatus 20 may output a message, as voice or text, informing that the navigation information 640 is revised. The second terminal apparatus 20 updates the navigation information 640 based on the revised route information received from the first terminal apparatus 10, and thus, user "B" can move to the destination based on a faster or more efficient route.

The respective components of a terminal apparatus for sharing position information for setting up the destination and establishing the destination according to the shared position information have been explained above. A method of a terminal apparatus for providing position information for setting up the destination and establishing the destination according to the provided position information according to an exemplary embodiment will now be explained below in detail.

Figure 7:
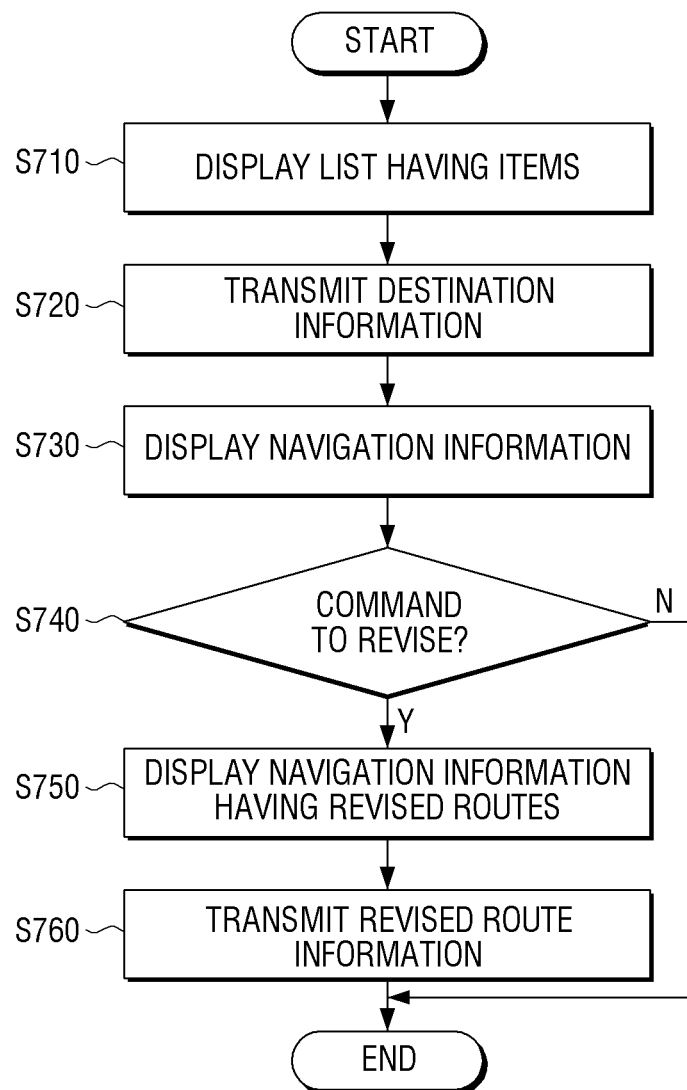
FIG. 7 is a flowchart provided to explain a method of providing information for setting up destination in a first terminal apparatus according to an exemplary embodiment.

FIG. 7 is a flowchart which illustrates a method of providing information for setting up a destination in the first terminal apparatus according to an exemplary embodiment.

Referring to FIG. 7, the first terminal apparatus displays a list having one or more items corresponding to one or more other terminal apparatuses at operation S710. The first terminal apparatus may preferably display the list including items corresponding to the firs terminal apparatus. The items included in the list provides profile information including name, or contact information of user (hereinbelow, 'user A') who owns the first terminal apparatus, and to provide profile including name or contact information of an acquainted person (hereinbelow, 'user B') who has the second terminal apparatus. The first terminal apparatus may display the list the items as described above.

If one item is selected from among the one or more items displayed on the list, the first terminal apparatus transmits destination information to the second terminal apparatus corresponding to the selected item at operation S720. Following will describe a method of transmitting destination information from the first terminal apparatus to the second terminal apparatus in detail.

Figure 8:
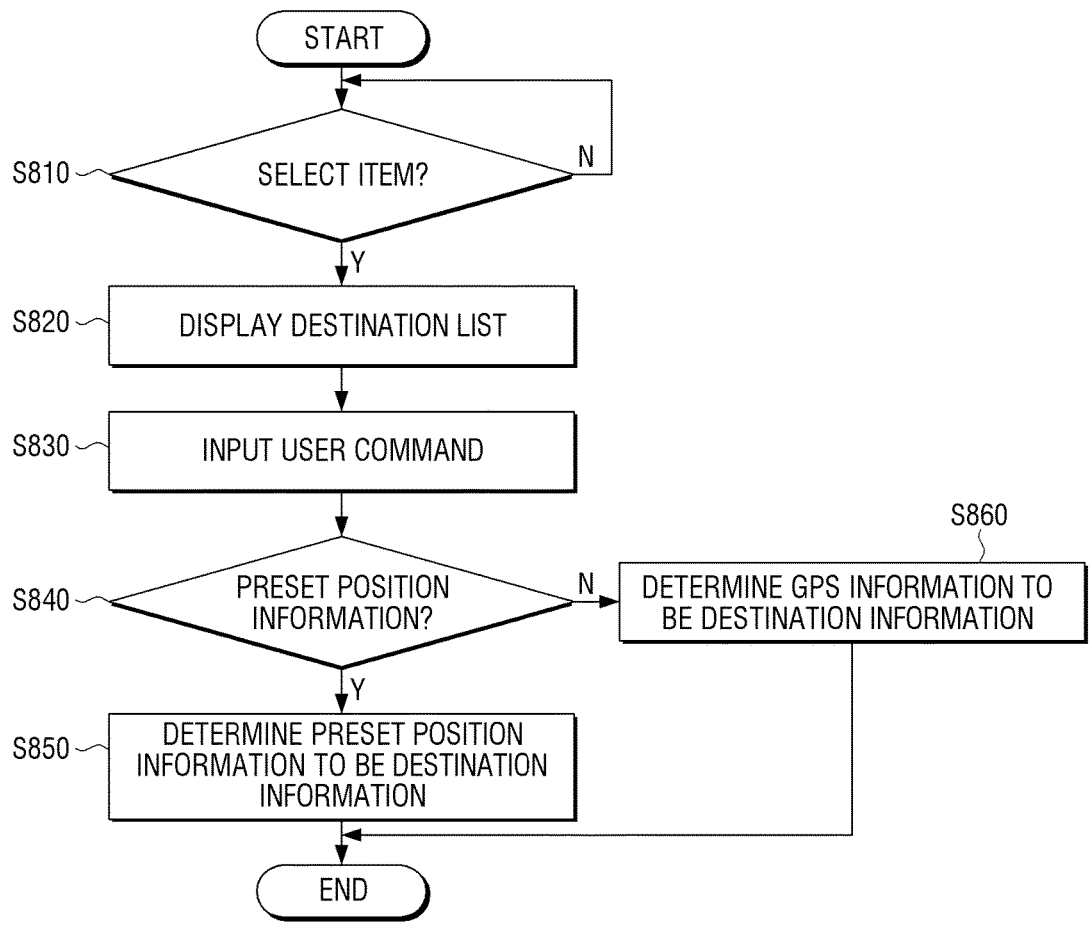
FIG. 8 is a flowchart provided to explain a method of transmitting destination information from a first terminal apparatus to a second terminal apparatus according to an exemplary embodiment.

FIG. 8 is a flowchart which illustrates a method of transmitting destination information from the first terminal apparatus to the second terminal apparatus according to an exemplary embodiment.

Referring to FIG. 8, the first terminal apparatus determines whether the item related to user "A" is selected from among the one or more items displayed on a list, at operation S810. As a result of the determining, if item about user "A" is selected from the plurality of items on the list, the first terminal apparatus displays the profile information of user "A" on the screen, at operation S820. After that, when a user command to provide position information is inputted, the first terminal apparatus generates a list of destinations for providing position information and displays the same on the screen, at operations S830, S840. That is, when an icon related to provision of position information included in the profile information of user "A" is selected, the first terminal apparatus generates a destination list and displays the same on the screen.

The destination list may include an item about home of user "A", an item about office of user "A", an item about place visited by user "A" for a preset period of time, and an item about current location of user "A". The item about home of user "A", the item about office of user "A", the item about place visited by user "A" for a preset period of time, are provided to acquire the prestored position information of the first terminal apparatus. The item about current location of user "A" is provided to acquire current position based on the GPS information received via the GPS receiver.

While the destination list having a plurality of items is displayed, if a user command is inputted about one of the plurality of items, the position information corresponding to the item related to the user-inputted select command is determined to be the destination information at operations S850, S860. If destination information is determined, the first terminal apparatus transmits the destination information to the second terminal apparatus, at operation S720. The first terminal apparatus then displays navigation information generated based on the destination information transmitted to the second terminal apparatus and current position information of the second terminal apparatus at operation S730.

According to an exemplary embodiment, if navigation information is received from the second terminal apparatus transmitting destination information, the first terminal apparatus displays the received navigation information. The navigation information is information including routes to a final destination marked on the map data stored in the second terminal apparatus, based on the destination information received from the first terminal apparatus and current position information of the second terminal apparatus. The navigation information may be regularly updated by the second terminal apparatus based on a preset period. Thus, if the updated navigation information is received from the second terminal apparatus, the first terminal apparatus may update and display navigation information according to the received updated navigation information.

According to another exemplary embodiment, if current position information of the second terminal apparatus is received from the second terminal apparatus, the first terminal apparatus may generate navigation information based on the destination information transmitted to the second terminal apparatus and the current position information received from the second terminal apparatus. Specifically, the first terminal apparatus may store map data. Thus, if the current position information of the second terminal apparatus is received from the second terminal apparatus, the first terminal apparatus marks routes on prestored map data based on the destination information transmitted to the second terminal apparatus and the current position information of the second terminal apparatus received from the second terminal apparatus. The first terminal apparatus may generate navigation information including route-marked map data and display the generated navigation information.

The second terminal apparatus may transmit current position information of the second terminal apparatus to the first terminal apparatus. The current position information may be updated at preset periods. In this case, the first terminal apparatus updates currently generated navigation information based on the destination information transmitted to the second terminal apparatus and the updated current position information of the second terminal apparatus. Thus, the first terminal apparatus may display the updated navigation information.

Therefore, the first and second terminal apparatuses may display navigation information, marking routes from a current point of user "B" of the second terminal apparatus to a destination established by user "A". User "B" can move toward the destination established by user "A" of the first terminal apparatus according to the navigation information displayed on the second terminal apparatus. Further, user "A" can monitor, in real time, the point or location that user "B" is currently moving to, based on the navigation information displayed on the first terminal apparatus.

The first terminal apparatus determines whether a command to revise the route is inputted from user "A" while displaying the navigation information at operation S740. As a result of the determining, if a command to revise the route is inputted, the first terminal apparatus revises the route based on the inputted command to revise the route and displays navigation information having the revised route at operation S750. For example, user "A" may monitor navigation information displayed on the first terminal apparatus, and find that user "B" moves on wrong routes or that the routes marked on the displayed navigation information is less efficient. In this case, using an input device such as a touch pen, user "A" may input alternative recommended routes on the displayed navigation information, and request to revise the routes. According to the request to revise the routes, the first terminal apparatus may mark the suggested alternative routes inputted by user "A" on the routes marked by the currently displayed navigation information. The first terminal apparatus transmits the revised route information to the second terminal apparatus at operation S760.

Thus, the second terminal apparatus updates navigation information displayed on a screen based on the revised route information. In other words, the second terminal apparatus revises routes marked on the navigation information according to the alternative routes suggested by user "A". Therefore, user "B" may refer to the suggested alternative routes of user "A" in moving toward the destination established by user "A".

So far, a method of providing information for setting up a destination from the first terminal apparatus to the second terminal apparatus is explained in detail. A method of establishing a destination based on information provided from the first and second terminal apparatuses according to an exemplary embodiment will now be described below.

Figure 9:
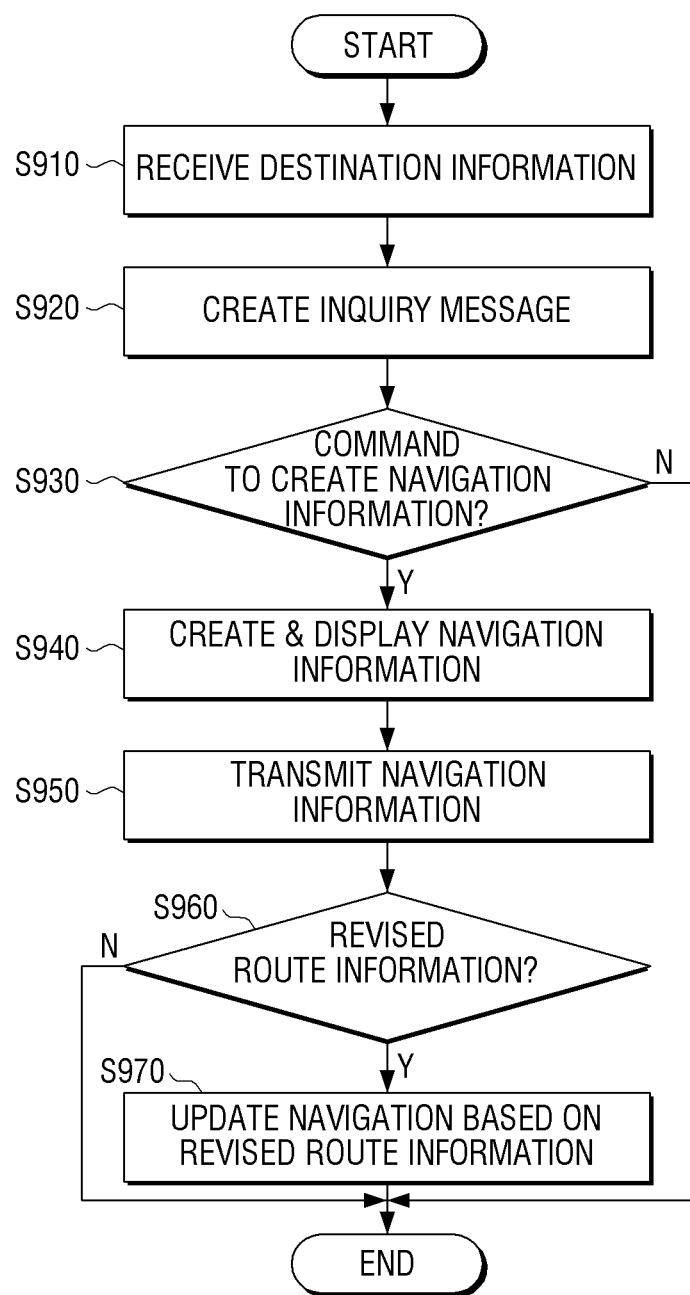
FIG. 9 is a flowchart provided to explain a method of establishing a destination based on information provided from a first and a second terminal apparatuses according to an exemplary embodiment.

FIG. 9 is a flowchart provided to explain a method of establishing the destination based on information provided from the first and second terminal apparatuses according to an exemplary embodiment.

Referring to FIG. 9, the first terminal apparatus receives destination information of the second terminal apparatus from the second terminal apparatus at operation S910. If destination information is received, the first terminal apparatus generates and displays an inquiry message asking whether or not to generate navigation information at operation S920. The inquiry message may include a message informing that destination information is received from the second terminal apparatus. While displaying the inquiry message, the first terminal apparatus may determines if a user command to generate navigation information is inputted at operation S930. As a result, if determining that the user command to generate navigation information is inputted, the first terminal apparatus generates navigation information based on the destination information received from the second terminal apparatus and current position information of the first terminal apparatus, and displays the generated navigation information at operation S940.

However, exemplary embodiments are not to be construed as limiting. Accordingly, the first terminal apparatus may generate navigation information including prestored map data with routes marked thereon based on the destination information received from the second terminal and GPS information received from the GPS receiver and store the same. Then as the user command is inputted, the first terminal apparatus may display the prestored navigation information based on the inputted user command.

After that, the first terminal apparatus transmits the generated navigation information to the second terminal apparatus at operation S950. To be specific, when a user command for location sharing is inputted, the first terminal apparatus may transmit the previously-generated navigation information to the second terminal apparatus which transmits the destination information. Meanwhile, the navigation information described above may be periodically updated based on a preset period. Accordingly, when a user command for location sharing is inputted, the first terminal apparatus may transmit the navigation information to the second terminal apparatus, as the navigation information is periodically updated. Accordingly, the second terminal apparatus may periodically update the navigation information received from the first terminal apparatus and display the same on the screen. Meanwhile, when a user command for location sharing is inputted, the first terminal apparatus may transmit current position information of the first terminal apparatus, i.e., the first terminal apparatus may transmit GPS information to the second terminal apparatus which transmits destination information. In this case, the first terminal apparatus may transmit the GPS information, which is the current position information of the first terminal apparatus, to the second terminal apparatus according to a preset period. The second terminal apparatus may generate and display navigation information based on the GPS information received from the first terminal apparatus and the destination information transmitted to the first terminal apparatus. Thus, the first and second terminal apparatuses according to an exemplary embodiment may display navigation information in which routes from the current position of user "A" to a destination are uniformly established. User "A" can move toward a destination that user "B" establishes according to the navigation information displayed on a screen of the first terminal apparatus. User "B" can monitor at real time which point user "A" is currently passing based on the navigation information displayed on the second terminal apparatus.

The first terminal apparatus determines whether or not revised route information is received from the second terminal apparatus transmitting navigation information at operation S960. As a result of the determining, if revised route information is received from the second terminal apparatus, the first terminal apparatus may update and display the navigation information displayed currently on a screen according to the revised route information at operation S970. Thus, user "A" can move by referring to the navigation information including the routes revised by the first terminal apparatus.

According to the exemplary embodiments, the terminal apparatus can provide routes to the user based on position information provided from other terminal apparatuses. Thus, the user may be provided with routes to a destination through his terminal apparatus without additional manipulations, such as inputting address or names of an intended destination. Therefore, the user can move to the intended destination safely and conveniently.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims.

What is claimed is:

1. A mobile device, comprising:
a communicator which is configured to communicate with an external mobile device;
an input unit which is configured to receive a user input;
a display; and
a controller which is configured to:
control the display to display a list regarding a plurality of external mobile devices on a screen of the display, and,
in response to receiving a first user input for selecting one external mobile device of the plurality of external mobile devices through the list, by the input unit, control the communicator to transmit destination information of the selected external mobile device to the selected external mobile device, the destination information indicating a destination of the selected external mobile device, wherein in response to information of a first route from a location of the selected external mobile device to the destination of the selected external mobile device being received from the selected external mobile device, the controller controls the display to display the first route on the screen based on the received information of the first route, and wherein in response to a second user input received by the input unit, the controller controls the display to display a revised route corresponding to the second user input on the first route displayed on the screen, and controls the communicator to transmit information of the revised route to the selected external mobile device, the second user input being a touch input on the screen to change the first rout to the revised route.

2. The mobile device of claim 1, wherein the communicator receives navigation information corresponding to the destination information and current position information of the selected external mobile device.

3. The mobile device of claim 2, wherein the navigation information is received from the selected external mobile device based on a preset period, and the controller controls the display to update and display the navigation information according to the received navigation information.

4. The mobile device of claim 1, wherein, if current position information of the selected external mobile device is received from the selected external mobile device via the communicator, the controller generates navigation information based on the destination information of the selected external mobile device and the received current position information of the selected external mobile device, and controls the display to display the generated navigation information.

5. The mobile device of claim 1, further comprising:
a storage which is configured to store at least one preset position information of the mobile device,
wherein the controller is further configured to control the display to display a destination list including an item corresponding to the at least one preset position information stored in the storage and an item corresponding to current position information of the mobile device, when a user input for provision of position information is inputted.

6. The mobile device of claim 5, further comprising:
a global positioning system (GPS) receiver which is configured to receive GPS information of the mobile device,
wherein, if an item corresponding to the at least one preset position information stored at the storage is selected, the controller is further configured to determine position information corresponding to the selected item corresponding to the at least one preset position information as the destination information and control the communicator to transmit the destination information to the selected external mobile device, and
wherein if an item corresponding to the current position information is selected, the controller is further configured to determine GPS information received from the GPS receiver as the destination information and control the communicator to transmit the destination information to the selected external mobile device.

7. A mobile device, comprising:
a communicator which is configured to communicate with an external mobile device;
an input unit which is configured to receive a user input;
a display; and
a controller which is configured to:
control the display to display a list regarding a plurality of external mobile devices, and,
in response to receiving a user input for selecting one external mobile device of the plurality of external mobile devices through the list, by the input unit, control the communicator to receive, from the selected external mobile device, destination information of the selected external mobile device, the destination information indicating a destination of the mobile device, and
generate navigation information including a first route from a location of the mobile device to the destination based on the received destination information and current position information of the mobile device, wherein the display displays the navigation information, and
wherein the controller is further configured to control the communicator to transmit information of the first route to the external mobile device, and
wherein in response to information regarding a revised route being received from the selected external mobile device, the controller updates the navigation information based on the information regarding the revised route, and
wherein the updated navigation information includes the first route and the revised route.

8. The mobile device of claim 7, wherein the display is further configured to display an inquiry message inquiring whether or not to generate the navigation information, and
the controller controls the display to display the navigation information in response to a user input inputted via the input unit.

9. The mobile device of claim 7, wherein the navigation information is periodically updated based on a preset period, and
the controller controls the communicator to transmit the navigation information to the selected external mobile device, when a user input for location sharing is inputted via the input unit.

10. A method for providing information, the method comprising:
displaying, by a mobile device, a list regarding a plurality of external mobile devices on a screen;
in response to receiving a first user input for selecting an external mobile device of the plurality of external mobile devices through the list, transmitting, by the mobile device, destination information of the selected external mobile device to the selected external mobile device, the destination information indicating a destination of the selected external mobile device;
receiving, by the mobile device, information of a first route from a location of the selected external mobile device to the destination of the selected external mobile device, from the selected external mobile device;
displaying, by the mobile device, the first route based on the received information on the screen;
in response to a second user input being received, transmitting, to the selected external mobile device, information of a revised route corresponding to the second user input, and displaying, by the mobile device, the revised route on the first route displayed on the screen, the second user input being a touch input on the screen to change the first route to the revised route.

11. The method of claim 10, the revised route comprises the destination information and current position information of the selected mobile device.

12. The method of claim 11, wherein the information of the first route is received from the selected external mobile device based on a preset period.

13. The method of claim 10, further comprising, when current position information of the selected external mobile device is received from the selected external mobile device, generating navigation information based on the destination information and the received current position information and displaying the generated navigation information.

14. The method of claim 10, wherein the transmitting the destination information of the selected external mobile device comprises:
when a user input for provision of position information is inputted, displaying a destination list including an item corresponding to at least one or more of prestored position information and an item corresponding to-The current position information of the mobile device.

15. The method of claim 14, wherein the transmitting the destination information of the selected external mobile device further comprises:
inputting a user input while displaying the list;
determining position information corresponding to a selected item as the destination information, if the inputted user input directs to select an item corresponding to at least one or more of the prestored position; and
receiving global positioning system (GPS) information and determining the received GPS information as the destination information, if the inputted user input is a command to select the item corresponding to the current position information.

16. A method comprising:
displaying, by a mobile device, a list regarding a plurality of external mobile devices on a screen of the mobile device;
in response to receiving a user input for selecting one external mobile device of the plurality of external mobile devices through the list, receiving, by the mobile device, destination information of the selected external mobile device from the selected external mobile device, the destination information indicating a destination of the mobile device;
acquiring, by the mobile device, current position information of the mobile device;
generating, by the mobile device, navigation information based on the received destination information and the acquired current position information;
displaying, by the mobile device, the navigation information including a first route from the location of the mobile device to the location of the selected external mobile device on the screen;
transmitting, by the mobile device, information of the first route to the selected external mobile device; and
in response to information regarding a revised route being received from the selected external mobile device, updating, the navigation information based on the information regarding the revised route,
wherein the updated navigation information includes the first route and the revised route.

17. The method of claim 16, further comprising:
displaying an inquiry message asking whether to generate the navigation information and wherein the generated navigation information is displayed according to a user input.

18. The method of claim 16, wherein the navigation information is periodically updated based on a preset period, the method further comprising transmitting the navigation information to the selected external mobile device, when a user input for location sharing is inputted.

19. A system for sharing position information, comprising:
a first mobile device;
a second mobile device,
wherein the first mobile device displays a list regarding a plurality of external mobile devices including the second mobile device on a screen of the first mobile device, and, in response to receiving a first user input for selecting the second mobile device of the plurality of external devices through the list, transmits destination information of the second mobile device to the second mobile device, the destination information indicating a destination of the second mobile device; and
wherein the second mobile device generates navigation information based on the destination information received from the first mobile device and current position information of the second mobile device,
wherein the first mobile device receives information of a first route from a location of the second mobile device to the destination of the second mobile device, from the second mobile device, and displays the first route on the screen, and
wherein in response to a second user input received by the first mobile device, the first mobile device displays a revised route corresponding to the second user input on the first route displayedon the screen, transmits information of the revised route to the second mobile device, the second user input being a touch input on the screen to change the first route to the revised route.

20. A method comprising:
displaying, on a screen of a first mobile device, an item comprising profile information on users of the first mobile device and a second mobile device;
displaying, on the screen of the first mobile device, a destination list comprising an item of pre-stored position information of the first mobile device and an item of current position information of the first mobile device in response to a user input;
selecting one of the item of the pre-stored position information and the item of the current position information on the destination list as destination information of the second mobile device, the destination information indicating a destination of the second mobile device;
transmitting the destination information to the second mobile device;
receiving information of a first route from a location of the second mobile device to the destination of the second mobile device, from the second mobile device;
displaying the first route on the screen;
in response to a user input received by the first mobile device, transmitting, to the second mobile device, information of a revised route corresponding to the user input, and displaying the revised route on the first route displayed on the screen, the user input being a touch input on the screen to change the first route to the revised route.

21. The method of claim 20, wherein, upon receiving the destination information, the second mobile device generates navigation information based on the received destination information and current position information of the second mobile device.

22. The method of claim 21, wherein the second mobile device displays the generated navigation information, and transmits the generated navigation information to the first mobile device.

23. The method of claim 20, wherein the profile information comprises at least one of a name or an address of a user of the first mobile device and the second mobile device.

* * * * *